United States Patent [19]

Inaba

[11] Patent Number: 5,063,489
[45] Date of Patent: Nov. 5, 1991

[54] SWITCHING REGULATOR HAVING IMPROVED SWITCHING CONTROL ARRANGEMENT

[75] Inventor: Katsuhiko Inaba, Tokyo, Japan

[73] Assignee: NEC Corporation, Tokyo, Japan

[21] Appl. No.: 505,391

[22] Filed: Apr. 6, 1990

[30] Foreign Application Priority Data

Apr. 6, 1989 [JP] Japan .................................. 1-85707

[51] Int. Cl.$^5$ .......................................... H02M 3/335
[52] U.S. Cl. ........................................ 363/21; 363/97; 323/902
[58] Field of Search ................... 363/21, 95, 97, 98, 363/24, 25, 26; 323/902

[56] References Cited

U.S. PATENT DOCUMENTS

| | | | |
|---|---|---|---|
| 3,909,702 | 9/1975 | Hart | 323/902 X |
| 4,156,273 | 5/1979 | Sato | 323/902 X |
| 4,196,320 | 4/1980 | Townsend | 323/902 X |
| 4,378,585 | 3/1983 | Bete | 323/902 X |
| 4,521,672 | 6/1985 | Fronius | 363/95 X |
| 4,761,724 | 8/1988 | Brown et al. | 323/902 X |

*Primary Examiner*—Steven L. Stephan
*Assistant Examiner*—Emanuel Todd Voeltz
*Attorney, Agent, or Firm*—Sughrue, Mion, Zinn, Macpeak & Seas

[57] ABSTRACT

In order to obtain a stable dc output from a switching regulator of a type in which a switching control arrangement is provided with an optical coupler, an A-D converter is arranged to provide the optical coupler with a digital error signal. This error signal corresponds to a difference between the regulated dc output and a reference voltage. The digital output of the optical coupler is converted into a corresponding analog signal at a D-A converter. The output of the D-A converter is applied to a comparator and is compared thereat with a reference signal voltage for controlling a switching device.

3 Claims, 2 Drawing Sheets

SWITCHING REGULATOR HAVING IMPROVED SWITCHING CONTROL ARRANGEMENT

BACKGROUND OF THE INVENTION

1. Field of the Invention

The present invention relates generally to a switching regulator and more specifically to a switching regulator of a type wherein a switching control arrangement includes an optical coupler. The present invention features the provision of an improved switching control arrangement which facilitates circuit design and which enables a stable dc (direct current) voltage to be derived.

2. Description of the Prior Art

In order to obtain a dc power output without an undesirable increase in the number of electronic components, it is a known practice to implement dc-to-dc conversion of a rectified but unregulated ac (alternate current) line voltage through the use of a switching regulator. This kind of power supply circuitry is currently employed in a variety of electronic equipment.

Before describing in detail the present invention a known switching regulator will be discussed with reference to FIG. 1.

Input terminals 11 and 12 of a switching regulator 10 are supplied with a rectified but unregulated ac line voltage (100 V by way of example). A capacitor 14, coupled across the input terminals 11, 12, functions as a capacitor filter. A transformer 16 is provided with a primary winding N1 and a secondary winding N2. The winding N1 and a switching transistor 18 are coupled in series across the input terminals 11 and 12. The transistor 18 is selectively rendered conductive (viz., switched on and off) by a train of pulses applied thereto from a switching transistor controller 20.

An ac voltage developed across the secondary winding N2 is rectified and smoothed at a rectifier/smoothing circuit 22. The output voltage Va of the circuit 22 is applied to output terminals 24, 26 and also applied to one input terminal 28a of an error amplifier 28 which forms part of a switching control arrangement. The amplifier 28 is further supplied with a reference voltage Vref via the other input terminal 28b, and is arranged to generate an error voltage Vb which corresponds to an amplified difference voltage between the two input voltages Va and Vref. The output voltage Vb (analog) is applied to an optical coupler 30 which generates an analog output voltage Vc proportional to the error voltage Vb applied thereto. The optical coupler 30 electrically isolates the input and output of the switching control arrangement.

A comparator 32 receives the analog voltage Vc from the optical coupler 30 and also receives a reference voltage Vd from a reference signal generator 34. The reference voltage Vd takes the form of a triangular or saw tooth wave by way of example. An output voltage Ve of the comparator 32, in the form of consecutive pulses, is applied to the switching transistor controller 20 which controls the transistor 18 by varying the duty cycle thereof. The reference signal or voltage Vd has a frequency which is identical with the switching frequency of the transistor 18.

With the arrangement as described above, in the event that the output voltage Va exceeds the reference voltage Vref, the output Vb of the error amplifier 28 rises accordingly. This allows the optical coupler 30 to generate its output voltage Vc higher than in the case of a stable state of the regulator 10, thereby to reducing the width of each of the pulses derived from the comparator 32. Consequently, the "on" time duration of the transistor 18 is shortened which causes the dc output voltage Va to become lower. Thus, the dc output voltage Va is lowered or adjusted toward the predetermined value (Vref). On the contrary, in the case that the output dc voltage Va is lowered below the reference voltage Vref, as will be understood from the above description, the output dc voltage Va is controlled to the predetermined value (Vref) by the above-mentioned switching technique.

As previously mentioned, the dc voltage applied to the input terminals 11 and 12, is a rectified but unregulated ac line voltage and hence it is inherently susceptible to external influences and/or noise. That is to say, the output of the optical coupler tends to be susceptible to ambient or environmental temperature.

Further, as it is virtually impossible to obtain any two optical couplers with exactly the same frequency verses gain and phase characteristics, in the event that the optical coupler in a circuit fails and requires replacement, a problem arises in that pains are required to restore the circuit to a suitable operating condition. In some cases the regulated dc output may become unstable or in the worst case, the amplifier may undergo oscillation.

Thus, as will be appreciated, in addition to the problems encountered during replacement, the optical coupler inherently introduces the need for an abnormally high degree of care to be exercised when designing and assembling a circuit of the nature in question in order to obtain a stable dc output.

SUMMARY OF THE INVENTION

It is an object of this invention to provide a switching regulator including an improved switching control arrangement by which a stable dc output can be obtained.

Another object of this invention is to provide a switching regulator including an improved switching control arrangement by which circuit design can be facilitated.

Still another object of this invention is to provide a switching regulator including an improved switching control arrangement by which a stable dc output can be derived irrespective of unit to unit variation in the operational characteristics of the optical coupler used in the control arrangement.

Still another object of this invention is to provide a switching regulator including an improved switching control arrangement in which an optical coupler used in the control arrangement is no longer required a to exhibit strict operational frequency versus gain and/or phase characteristics.

In order to fulfil the object, viz, in order to obtain a stable dc output from a switching regulator of a type whose input and output are electrically isolated by an optical coupler, an A-D converter is arranged to provide the optical coupler with a digital error signal. The digital error signal corresponds to a difference between the regulated dc output and a reference voltage. The digital output of the optical coupler is converted into a corresponding analog signal in a D-A converter. The output of the D-A converter is applied to a comparator and is compared thereat with a reference signal voltage for controlling a switching device. According to this invention, there is no need to pay extremely close attention to the optical coupler in the circuit nor to parts replacement. Thus, even if the optical coupler initially provided is replaced with a new one due to a breakdown (for example), stable operation of the switching regulator is ensured.

One aspect of this invention takes the form of a switching regulator, which comprises: a transformer, the transformer having a primary winding and a secondary winding, the primary winding being coupled to receive an unregulated dc voltage; an electrical switching means, the electrical switching means being coupled to the primary winding for intermittently operating the transformer; a first controller, the first controller being coupled to control the electrical switching means by varying a duty cycle thereof; an A-D converter, the A-D converter being coupled to receive an error signal indicating a difference between a dc output of the switching regulator and a first reference signal; an optical coupler, the optical coupler being coupled to receive the error signal; a D-A converter, the D-A converter being coupled to receive the output of the optical coupler; and a second controller, the second controller being coupled to control the electrical switching means in accordance with the output of the D-A converter.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 1:
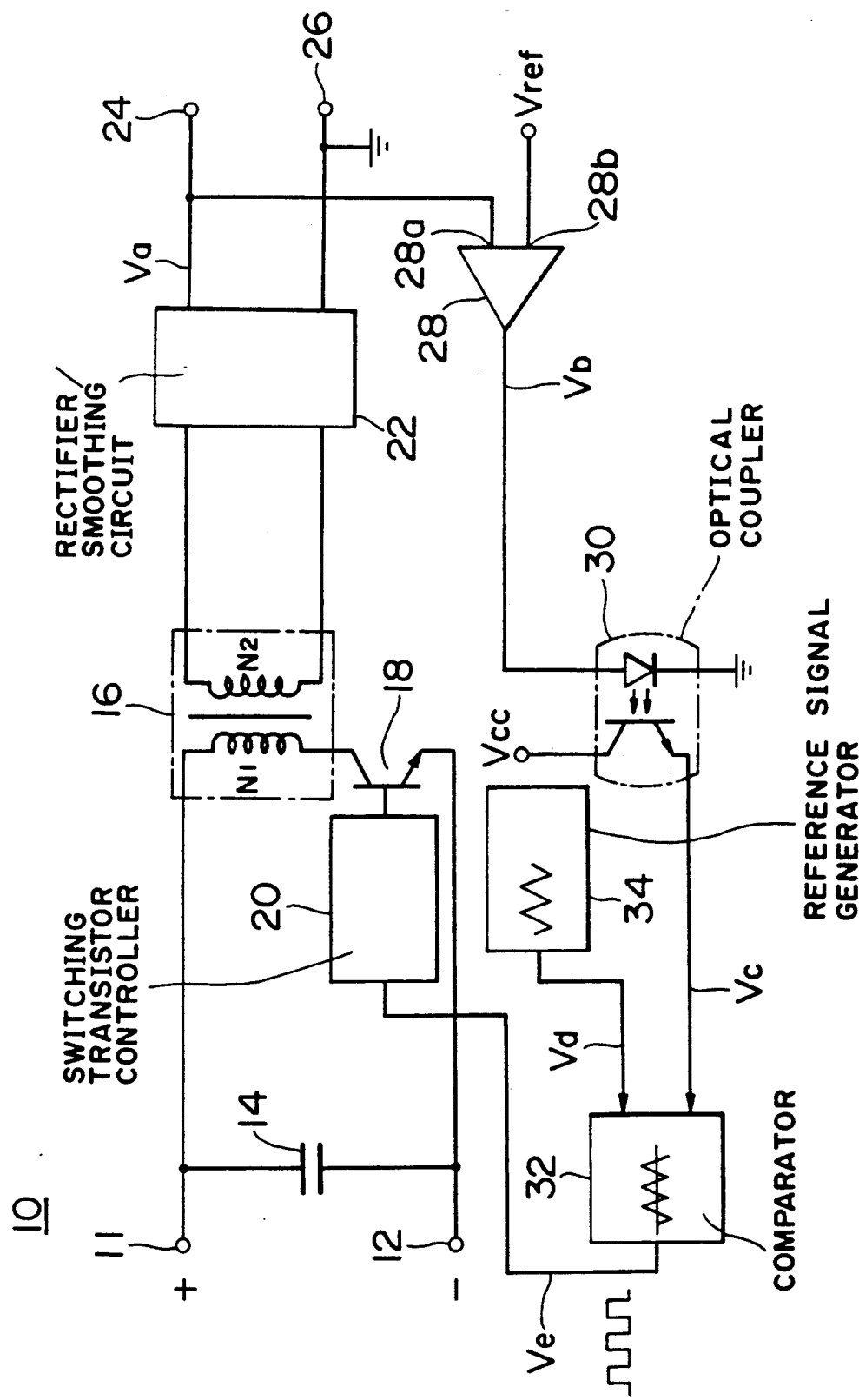
FIG. 1 is a block diagram showing a known switching regulator circuit.

The embodiment of this invention will be discussed with reference to FIG. 2. This invention is characterized in that an A-D (analog-to-digital) converter 50 is provided to receive the output of the error amplifier 28 and to apply a corresponding digital signal to the optical coupler 30. The output of the optical coupler 30 is converted into a corresponding analog signal by a D-A (digital-to-analog) converter 52 and then applied to the comparator 32. The A-D and D-A converters 50, 52 may be $\mu$PC50C and $\mu$PC6900C types respectively both manufactured by NEC Corporation, respectively, merely by way of example.

Figure 2:
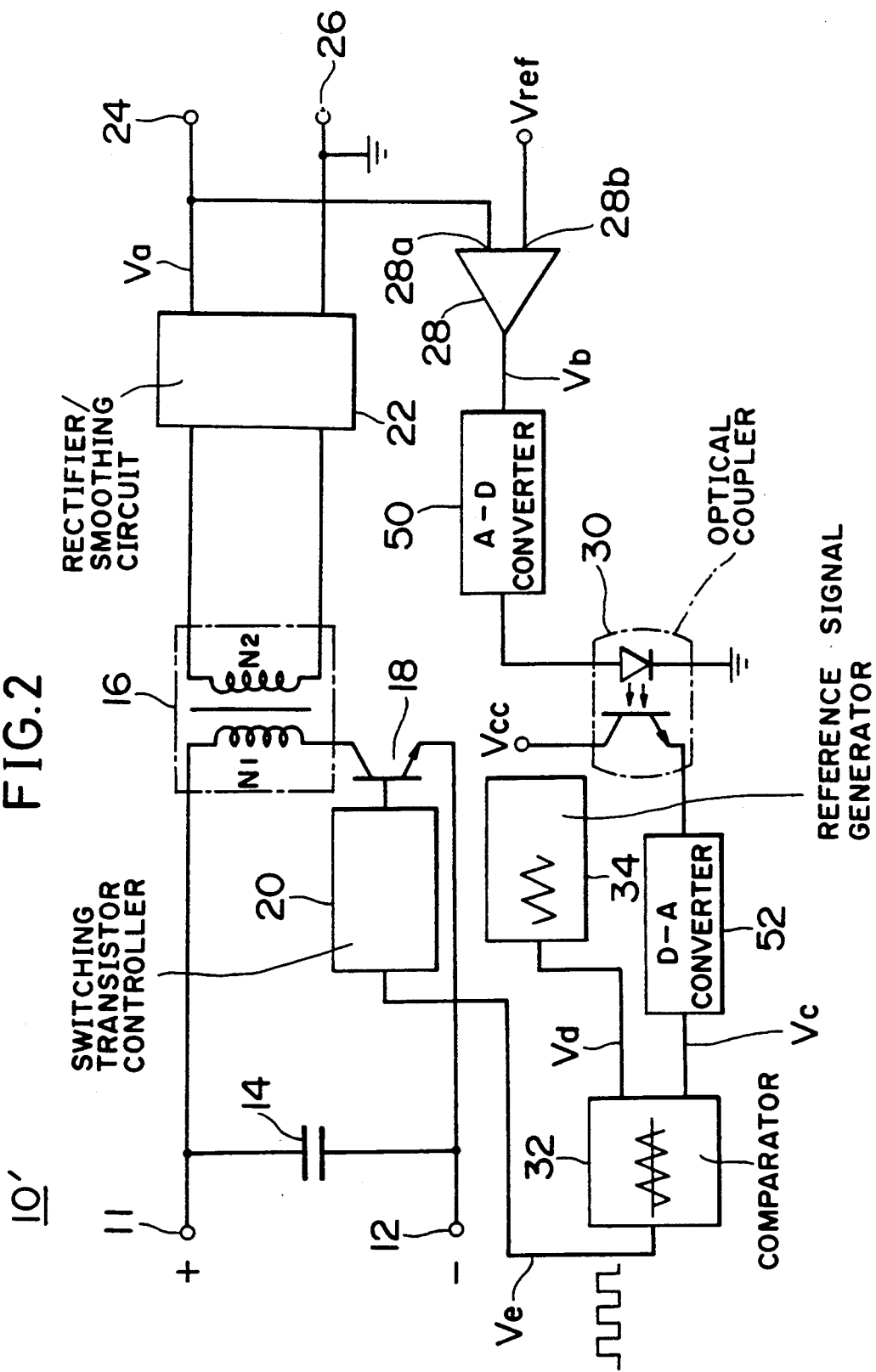
FIG. 2 is a block diagram showing a preferred embodiment of the present invention.

The circuit of FIG. 2 differs from that of FIG. 1 in that the A-D and D-A converters 50, 52 have been added to the former arrangement. Accordingly, the remaining portions of FIG. 2 will be referred to only for describing the features of the instant invention.

In the event that the dc output voltage Va exceeds the reference voltage Vref, then the output voltage of the error amplifier 28 becomes higher than a predetermined value. The A-D converter 50 converts the analog output Vb into a representative number sequence. More specifically, the output of the A-D converter 50 is such that the number of pulses within a given time duration increases or the pulse width of each output pulse is expanded. In the FIG. 2 arrangement, the optical coupler 30 should have a relatively high speed response in order to effectively transfer the digital signal inputted thereto. The digital signal thus generated from the optical coupler 28, is converted into a corresponding analog signal and then applied to the comparator 32. The comparator 32 outputs a train of pulses each of which has a pulse width narrower than a predetermined value. Thus, the "on" time duration of the transistor 18 is reduced and hence the dc output voltage Va is controlled toward the predetermined value.

On the contrary, if the dc output voltage Va falls below the reference voltage Vref, as will be understood from the above description, the comparator 32 allows the pulse width of each pulse generated therefrom, to be reduced. Thus, the dc output Va is controlled to increase toward the predetermined value (Vref).

Since the optical coupler 30 is supplied with a digital signal instead of an analog one, the strict requirements inherent in the prior art with respect to the optical coupler are obviated. Accordingly, the selectable range of optical couplers can be expanded to a considerable extent.

While the foregoing description describes only one embodiment of the present invention, the various alternatives and modifications possible without departing from the scope of the present invention, which is limited only by the appended claims, will be apparent to those skilled in the art.

What is claimed is:

1. A switching regulator, comprising:
    a transformer, said transformer having a primary winding and a secondary winding, said primary winding being coupled to receive an unregulated dc voltage;
    an electrical switching means, said electrical switching means being coupled to said primary winding for intermittently operating said transformer;
    a first controller, said first controller being coupled to control said electrical switching means by varying a duty cycle thereof;
    a rectifier, coupled to said secondary winding, for producing a dc output to be derived as an output of said switching regulator;
    an error amplifier, coupled to receive the dc output of said rectifier and a first reference signal, for generating an error signal indicating an amplitude difference therebetween;
    an A-D converter, coupled to receive said error signal, for generating a digital error signal corresponding to said error signal;
    an optical coupler, said optical coupler being coupled to receive said digital error signal;
    a D-A converter, coupled to receive the output of said optical coupler, for generating an analog error signal corresponding to the digital error signal; and
    a second controller, said second controller being coupled to control said electrical switching means via said first controller in accordance with said analog error signal.

2. A switching regulator as claimed in claim 1, wherein said second controller is a comparator for comparing the output of said D-A converter and a second reference signal.

3. A switching regulator as claimed in claim 2, wherein said second reference signal takes a form of a saw tooth wave voltage.

* * * * *